(12) United States Patent
Kasiraj et al.

(10) Patent No.: US 6,967,810 B2
(45) Date of Patent: Nov. 22, 2005

(54) SYSTEM AND METHOD FOR WRITING HDD DEPENDING ON DIRECTION OF HEAD SKEW

(75) Inventors: Prakash Kasiraj, San Jose, CA (US); Mason Lamar Williams, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 71 days.

(21) Appl. No.: 10/674,155

(22) Filed: Sep. 29, 2003

(65) Prior Publication Data

US 2005/0068664 A1 Mar. 31, 2005

(51) Int. Cl.$^7$ .............................................. G11B 5/596
(52) U.S. Cl. ......................... 360/78.04; 360/76; 360/55
(58) Field of Search ............................. 360/55, 75, 76, 360/78.01, 78.04, 78.08, 39, 40, 48, 61, 69

(56) References Cited

U.S. PATENT DOCUMENTS 6,185,063 B1    2/2001   Cameron ................. 360/78.04
6,714,369 B2 *  3/2004   Miles ......................... 360/51
2003/0197968 A1 * 10/2003 Sacks et al. ................. 360/75

OTHER PUBLICATIONS

Proceedings: "The Design and Implementation of a Log-Structured File System". Rosenblum and Ousterhout. Proceedings of the 13$^{th}$ ACM Syposium on Operating Systems Principles and the Feb. 1992 ACM Transactions on Computer Systems. pp. 1–15, Jul. 24, 1991.

* cited by examiner

*Primary Examiner*—David Hudspeth
*Assistant Examiner*—Jason Olson
(74) *Attorney, Agent, or Firm*—John L. Rogitz

(57) ABSTRACT

Data is written to a hard disk drive using shingled writing principles, i.e., each data track is partially overwritten when an immediately contiguous data track is written. Two or more contiguous data tracks establish a band, and a band may store data from an AV file. Tracks may be written in sequence toward or away from the inside diameter (ID) of the disk, depending on their radial location on the disk and the skew of the write element.

19 Claims, 2 Drawing Sheets

SYSTEM AND METHOD FOR WRITING HDD DEPENDING ON DIRECTION OF HEAD SKEW

FIELD OF THE INVENTION

The present invention relates to hard disk drives.

BACKGROUND OF THE INVENTION

In conventional hard disk drives, data is written in concentric circular tracks by a magnetic recording head which is positioned above a spinning disk. The magnetic recording head consists of a write head element which is used during writing, and a read head element which is used during reading. During writing, the position of the magnetic recording head above the disk is precisely controlled by a servo-mechanical feedback loop so that the written data tracks do not overlap. The width of each track is determined by the width of the write head element. The center-to-center spacing of each track (also known as the track pitch) is slightly larger than the track width, and is determined by the servomechanical control system which keeps the head properly positioned above the disk. Each track is separated from its neighbor by a guard band whose width is equal to the track pitch minus the track width. During read back, the read back element in the recording head is precisely positioned above a single track. The width of the read back element is usually equal to or smaller than the width of a written track, so that the read head element detects the signal from only that single track and not from neighboring tracks.

With these hard disk drives, each track may be randomly written at any time without disturbing the data on any of the other tracks. This ability to randomly update and access the data on the surface of the disk is an important characteristic of hard disk drives which is not shared by all data storage systems. However, it can be difficult to achieve high areal density in conventional hard disk drives which use rotary actuators so that the length of the write pole can be made as large as desired, because conventional recording schemes require the write head to be smaller in width than the track width, and of a length not much larger, to avoid writing on the adjacent tracks. The resulting small area of the writing pole limits the ability to obtain large write fields under the poletip. One approach to solve this problem would be to use near zero-skew actuators, but such actuators have a performance penalty associated with longer arms.

In U.S. Pat. No. 6,185,063, incorporated herein by reference, so-called shingled track writing is mentioned in which partially overlapping tracks are used. Specifically, with shingled track writing, data tracks are written such that each written track partially overlaps an immediately adjacent track that is contiguous to it, like shingles on a tiled roof. Thus, a first track is partially overwritten when a second track contiguous to the first is written, which in turn is partially overwritten when a third track contiguous to the second is written, and so on.

As recognized herein, unlike the conventional approach described above, the write head width advantageously can be significantly larger than the track pitch in shingled track writing, whereas the width of the read back head element can be slightly less than the track pitch so the read back head still detects signal from only a single track and not from neighboring tracks.

The present invention but not the above-referenced patent critically recognizes that although, for reasons discussed more fully below, shingled writing can result in higher data storage density, a consequence of shingled writing of adjacent tracks is that poorly written data from the side of a wide and long head can fall on already written data when the slider is skewed, i.e., oriented obliquely with respect to the data tracks. More specifically, when a "tall" write pole (a write pole having a thickness greater than the track pitch) is skewed in a longitudinal recording system, writing data in one track disturbs data written in an adjacent track. Since most of the write flux in longitudinal recording emanates at the leading edge of the write pole, the disturbance takes the form of a slight erasure of data in the adjacent track, and multiple write passes are required to erase adjacent data. In contrast, when a "tall" write pole is skewed in a perpendicular recording system, writing data in one track still disturbs data written in an adjacent track, but because significant write flux in perpendicular recording emanates from all portions of the write pole, only a single pass results in erasing data in adjacent tracks. In either case, data in adjacent tracks can be disturbed even when the track width of the write head is narrower than the track pitch. Having recognized these drawbacks, the solutions herein are provided.

SUMMARY OF THE INVENTION

A hard disk drive (HDD) includes at least one rotatable disk and a write element, potentially a perpendicular recording write element, configured for writing data to the disk in concentric data tracks. A HDD controller controls the write element to always write adjacent tracks in sequence toward an inner diameter (ID) in a first radial region of the disk, and to always write adjacent tracks in sequence toward an outer diameter (OD) in a second radial region of the disk. If desired, the write element may be configured with zero skew for writing in a region between the first and second regions.

For perpendicular recording, when the skew of the write element is such that an axial vector from the leading edge of the write element to the trailing edge lies to the left of the vector representing instantaneous disk motion relative to the write element, tracks are written from left to right. Ordinarily, such a head skew occurs in the inner zones of the disk. In contrast, when the skew of the write element in perpendicular recording is such that the vector from the leading edge to the trailing edge lies to the right of the disk motion vector, tracks are written from right to left. Ordinarily, such a head skew occurs in the outer zones of the disk. The opposite of the above is true for longitudinal recording when the trailing edge of the write element is left of the disk velocity vector, tracks are written from right to left, and when the trailing edge is right of the disk velocity vector, tracks are written from left to right.

A random update zone can be interposed between the inner and outer regions in which the write element has no skew. The track pitch in the random update zone may be equal to or substantially larger than the track pitch of the inner and outer zones to reduce adjacent track interference in the random update zone. Also, the width of the write element may be larger (or, in some implementations, smaller) than the track pitch of the inner and outer zones. The length of the write element may be larger than the track pitch to provide sufficient magnetic fields for writing data. In a preferred embodiment, at least one data band is established by at least two contiguous shingled tracks. A band may store only one file or it may store plural files.

In another aspect, a magnetic disk data recording system includes at least one disk defining an inner zone of at least one band of data, an outer zone of at least one band of data, and a mid-zone of at least one band of data between the inner and outer zones. Each band is established by at least two contiguous data tracks. Control means are provided for always writing adjacent tracks in the inner zone in a single radial sequence, track to track and for always writing adjacent tracks in the outer zone in the opposite radial sequence, track to track. With more specificity, for perpendicular recording of disks that rotate in the conventional counterclockwise direction, tracks in the inner zone are always written in sequence toward the outer zone and tracks in the outer zone are always written in sequence toward the inner zone, with the opposite being true for longitudinal recording. In the event that the disk is rotated clockwise, the direction of overlapped writing is reversed from the above. Skew of the write element in either the inner zone or outer zone, however, if desired may be eliminated.

In still another aspect, a hard disk drive (HDD) includes at least one disk defining bands of data, each being established by at least two contiguous concentric data tracks. The disk has an inner annular zone and an outer annular zone. A write element is configured for writing data to the disk. Means are provided for controlling the write element such that it writes data in tracks in the zones to avoid overwriting previously written tracks within the same band.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
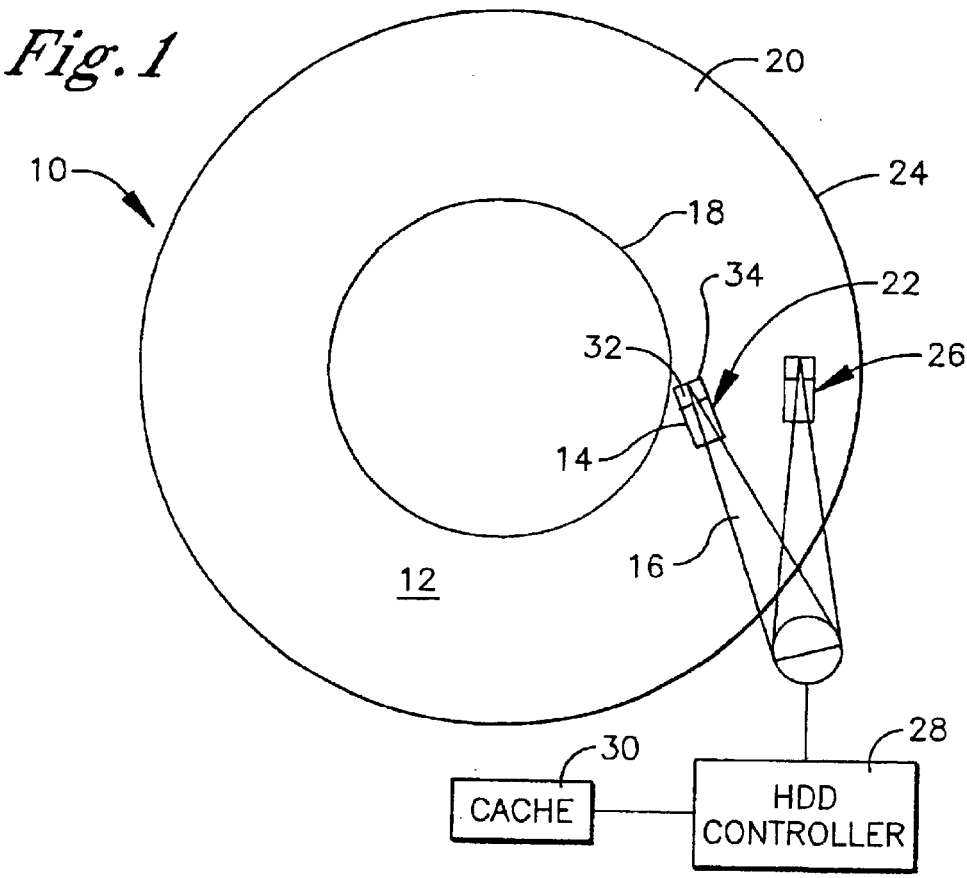
FIG. 1 is a schematic view of the hard disk drive, showing the actuator arm near the inner diameter (ID) and the outer diameter (OD) of the disk.

Referring initially to FIG. 1, a data storage system is shown, generally designated 10, which includes one or more (only one shown for clarity) rotatable hard disks 12 onto which data can be written and from which data can be read by a read/write head 14 that is mounted on an actuator arm 16 for movement of the head 14 over the disk 12 between an inner diameter (ID) 18 of a data storage area 20 of the disk 12 (indicated at position 22 of the head 14) and an outer diameter 24 of the storage area 20 (indicated at position 26 of the head 14). As shown, the angle of the head 14 relative to disk 12 motion is different in these two cases, resulting in different "skews" of the write element when writing in the inner regions of the disk as compared to writing in the outer regions of the disk. The head 14 and actuator 16 may be controlled by a processor such as a hard disk drive (HDD) controller 28, which executes the below-described shingled writing and file architecture in accordance with present principles. The controller 28 may also access a solid state data cache or buffer 30.

In accordance with HDD principles known in the art and as figuratively shown in FIG. 1, the head 14 may include a write element or pole 32 and a read element 34. The head 14 may be configured for longitudinal recording or for perpendicular recording.

Figure 2:
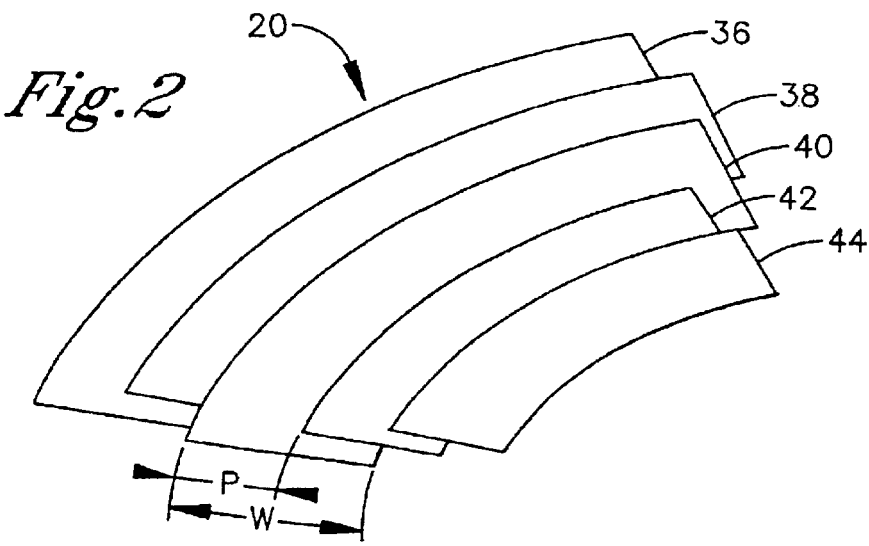
FIG. 2 is a perspective schematic view of the shingled data tracks of the disk, with portions broken away.

As shown in FIG. 2, data is written into the data storage area 20 in shingled fashion. More particularly, a first (in the example shown, outermost) data track 36 is overlapped by a second data track 38 that is immediately adjacent (i.e., contiguous) to the first data track 36, just to the inside of the first track 36, when data is written to the second data track 38. In turn, when data is written to a third data track 40 that is contiguous to the second data track 38, the second data track 38 is overlapped by the third track. Similarly, when data is written to a fourth data track 42 that is contiguous to the third data track 40, the third data track 40 is overlapped by the fourth track. When data is written to a fifth data track 44 that is contiguous to the fourth data track 42, the fourth data track 42 is overlapped by the fifth track 44. If the fifth track 44 is the last track, it is not overlapped by any other track. It is to be understood that the pattern of overlapping may be reversed, i.e., the first track 36 might overlay, instead of underlay, the second track 38, and so on. While only five data tracks are shown for clarity of disclosure, the disk 12 can contain many more data tracks.

In accordance with the present invention, a band is established by at least two contiguous data tracks. In a non-limiting implementation, the data storage area 20 or portion thereof might be subdivided into multiple bands with different numbers of tracks in each band, depending on the system requirements. A band stores data preferably from only one file. If desired, a guard band of, e.g., two tracks' width of unused surface area, can be established between adjacent bands of tracks to prevent the last track written from overlapping the data in the next band. This permits rewriting of any complete band of data.

As also shown in FIG. 2, the width "W" of the write element 32 shown in FIG. 1 can be larger than the track pitch "P" (essentially, the non-overlapped portion of the width of a data track). The width of the read element 34, however, is slightly less than the track pitch P, so that the read element 34 reads only signals from a single track. With the relatively wide write element width "W" and physical thickness, the write element 32 can generate higher fields at the disk 12, allowing disk coercivities to increase, grain sizes to decrease, and resulting in increased overall recording density.

A second advantage afforded by the above combination of structure is that the track pitch "P" need not be directly related to the write head width "W" (except the last in a band), so that tolerances constraining the write head width "W" can be relaxed. A third advantage is that the track pitch can be adjusted to match the read head track width to optimize HDD and head yields.

Figure 3:
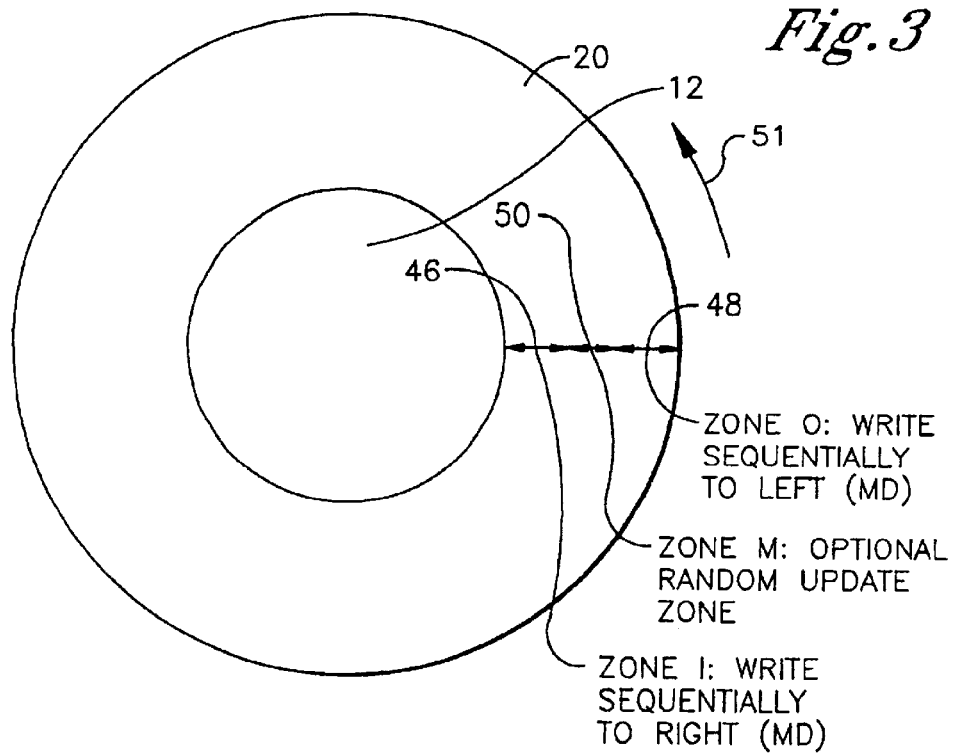
FIG. 3 is schematic diagram of the disk, showing the three zones of writing.

FIG. 3 shows that the data storage area 20 of the disk 12 defines, physically or logically, an inner annular zone 46 having a band or bands of data and an outer annular zone 48 having at least one band of data. Also, the preferred data storage area 20 has an annular mid-zone 50 between the inner and outer zones that defines an intermediate diameter (MD) of the disk 12. The tracks of the mid-zone 50 can define a pitch that is equal to or larger than that defined by the tracks of the inner and outer zones 46, 48. In one intended embodiment, the data in the mid-zone 50 is stored without overlapping of tracks to allow tracks in this zone to be randomly updatable. Data that is frequently updated or that requires random access, such as file allocation tables, can be stored in the mid-zone 50. When the write width is less than the track pitch in the inner zone 46 and mid-zone 50, the mid-zone 50 with zero skew can be randomly updatable and at the same time be made to have similar track pitch to the inner zone 46.

Figures 4, 5:
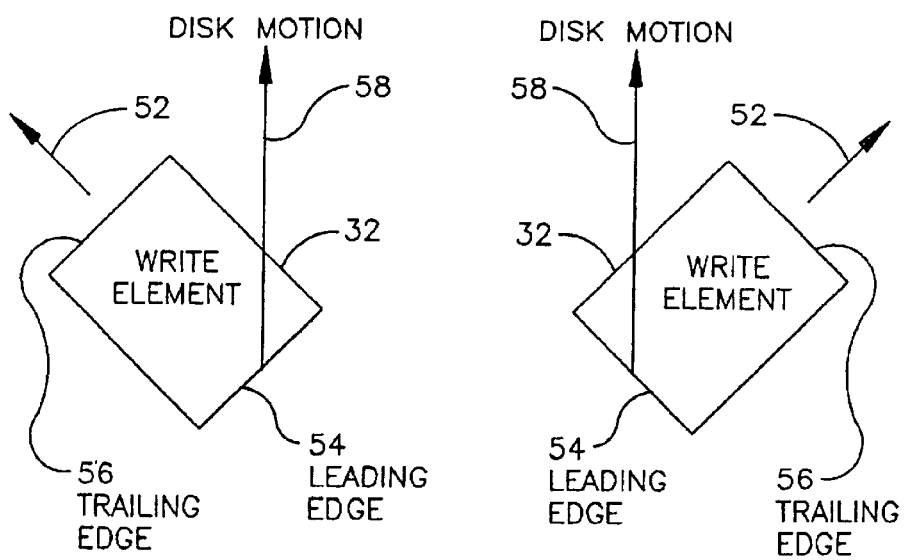
FIG. 4 is a schematic diagram looking at the surface of the disk, showing a vector representing instantaneous disk velocity and showing the write element with its trailing edge to the left of the disk velocity vector.
FIG. 5 is a schematic diagram looking at the surface of the disk, showing a vector representing instantaneous disk velocity and showing the write element with its trailing edge to the right of the disk velocity vector.

In accordance with the present invention and as indicated in cross-reference to FIGS. 3 and 4, for perpendicular recording of a disk that rotates conventionally (i.e., counterclockwise as indicated by the arrow 51), when the skew of the write element 32 is such that an axial vector 52 originating at the leading edge 54 of the write element 32 and extending toward the trailing edge 56 of the write element 54 lies to the left of the vector 58 representing instantaneous disk motion relative to the write element 32, tracks are written from left to right. Ordinarily, such a head skew occurs in the inner zone 46 of the disk. Thus, in such a case the above sequential writing operation can be stated somewhat differently, specifically, that the controller 28 in FIG. 1 causes same-band tracks in the inner zone 46 always to be written sequentially radially outwardly on the disk, track to track, toward the MD when more than two tracks of a band must be written pursuant to a write request, e.g., a request to write a relatively large audio-video (AV) file to disk.

In contrast, when the skew of the write element 32 in perpendicular recording is such that the vector 52 from the leading edge 54 to the trailing edge 56 lies to the right of the disk motion vector 58 as shown in FIG. 5, tracks are written from right to left. Ordinarily, such a head skew occurs in the outer zone 48 of the disk, in which case the sequential writing operation may be characterized by stating that the controller 28 always writes adjacent same-band tracks in the outer zone 48 sequentially radially inwardly on the disk, track to track, toward the MD.

The opposite of the above is true for longitudinal recording—when the trailing edge of the write element is left of the disk velocity vector as shown in FIG. 4, tracks are written from right to left, and when the trailing edge is right of the disk velocity vector as shown in FIG. 5, tracks are written from left to right. Tracks may be written in either direction in the mid-zone 50.

Accordingly, it may now be appreciated that the shingled writing method of the present invention provides a simple way of dealing with head skew in perpendicular recording. More particularly, normally the write pole in a perpendicular recording head must be sharply tapered so as to avoid adjacent track interference (ATI) when the recording head is positioned at a high skew angle. With the present method and system of shingled writing, the tracks within a band are written with the natural head 14 skew in mind, such that the write element does not overwrite previously written tracks within the same band. In this way, previously written data is not perturbed and adjacent track interference is not present.

Another advantage is that the number of times that any given data track can be subjected to stray fields from an adjacent track write may be restricted, removing a significant recording system design constraint both for longitudinal and perpendicular recording and also for novel recording approaches such as thermally assisted writing.

While the particular SYSTEM AND METHOD FOR WRITING HDD DEPENDING ON DIRECTION OF HEAD SKEW as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

We claim:

1. A hard disk drive (HDD) comprising:
   at least one rotatable disk;
   at least one write element configured for writing data to the disk in tracks; and
   at least one HDD controller controlling the write element, the controller always writing adjacent tracks in sequence coward an inner diameter (ID) in a first radial region of the disk, the controller always writing adjacent tracks in sequence toward an outer diameter (OD) in a second radial region of the disk, wherein the first region is radially outward from the second region if the HDD employs perpendicular recording, and otherwise, if the HDD employs longitudinal recording, the first region is radially inward from the second region.

2. The HDD of claim 1, wherein at least one data band is established by at least two contiguous tracks.

3. The HDD of claim 1, wherein tracks in at least one of: the first radial region, and the second radial region, define a truck pitch, and the write element defines a width equal to or larger than the track pitch.

4. The HDD of claim 1, wherein the write element is configured for perpendicular recording.

5. The HDD of claim 1, wherein the tracks are shingled.

6. The HDD of claim 1, further comprising a random update zone interposed between the first and second regions.

7. The HDD of claim 6, wherein a track pitch in the random update zone is equal to or larger than a track pitch in at least one of the first region, and the second region, to reduce adjacent track interference in the random update zone.

8. A magnetic disk data recording system comprising:
   at least one disk defining an inner zone of at least one band of data, each band being established by at least two contiguous data tracks, the disk also defining an outer zone of at least one band of data and a mid-zone of at least one band of data between the inner and outer zones; and
   control means for writing adjacent tracks in the inner zone always in a first radial sequence, track to track and for writing adjacent tracks in the outer zone always in a second radial sequence opposite to the first radial sequence, track to track, the control means executing random access writes to the mid-zone.

9. The system of claim 8, wherein tracks at least one of: the inner zone, and the outer zone, define a truck pitch, and the control means controls a write element defining a width larger than the track pitch.

10. The system of claim 8, wherein a track pitch in the mid-zone is at least as large as a track pitch in at least one of: the inner zone, and the outer zone, to reduce adjacent track interference in the mid-zone.

11. The system of claim 8, wherein the write element is configured for perpendicular recording, and the first radial sequence is radially outward.

12. The system of claim 8, wherein the write element is configured for longitudinal recording, and the first radial sequence is radially inward.

13. The system of claim 8, wherein the tracks are shingled.

14. A hard disk drive (HDD) comprising:
at least one disk defining bands of data each established by at least two contiguous concentric data tracks, the disk having at least an inner annular zone and an outer annular zone;
at least one write element configured for writing data so the disk; and
means for controlling the write element such that it writes data in tracks in the zones to avoid overwriting previously written tracks within the same band, wherein if the HDD employs perpendicular recording, the means for controlling always writes adjacent tracks in the inner annular zone sequentially radially outwardly on the disk, track to track, and always writes adjacent tracks in the outer annular zone sequentially radially inwardly on the disk, track to track, and otherwise, if the HDD employs longitudinal recording, the means for controlling always writes adjacent tracks in the inner annular zone sequentially radially inwardly on the disk, track to track, and always writes adjacent tracks in the outer annular zone sequentially radially outwardly on the disk, track to track.

15. The HDD of claim 14, wherein the means for controlling is at least one drive controller, the controller undertaking the controlling step by using radial writing sequence.

16. The HDD of claim 14, comprising an annular mid-zone between the inner and outer annular zones.

17. The HDD of claim 16, wherein a track pitch in the annular mid-zone is equal to or larger than a track pitch in at least one of: the inner annular zone, and the outer annular zone.

18. The HDD of claim 14, wherein the tracks are shingled.

19. The HDD of claim 14, wherein tracks at least one of: the inner annular zone, and the outer annular zone, define a track pitch, and the write element defines a width larger than the track pitch.

* * * * *